United States Patent [19]

Ichikawa et al.

[11] Patent Number: 5,418,203
[45] Date of Patent: May 23, 1995

[54] FUEL ABSORBENT AND A PROCESS FOR MAKING THE FUEL ABSORBENT

[75] Inventors: Masayoshi Ichikawa; Shinji Hasegawa; Hiroshi Ito; Takashi Ohta; Norio Sato; Akane Okada, all of Aichi, Japan

[73] Assignee: Toyoda Gosei Co., Ltd., Nishikasugai, Japan

[21] Appl. No.: 77,192

[22] Filed: Jun. 16, 1993

[30] Foreign Application Priority Data

Jun. 22, 1992 [JP] Japan .................................. 4-187656

[51] Int. Cl.$^6$ ............................................. B01J 20/26
[52] U.S. Cl. .................................................. 502/402
[58] Field of Search .......................................... 502/402

[56] References Cited

U.S. PATENT DOCUMENTS 5,174,938  12/1992  Ito et al. ............................... 427/180

FOREIGN PATENT DOCUMENTS 64-067222  3/1989  Japan .
01227861   9/1989  Japan .

Primary Examiner—Anthony McFarlane
Assistant Examiner—Nhat D. Phan
Attorney, Agent, or Firm—Cushman, Darby & Cushman

[57] ABSTRACT

A fuel absorbent is provided in which polymer particles having a fuel absorbing ability are contained or dispersed in a binder matrix permeable to fuel. The fuel permeates the binder and is absorbed by the polymer particles. A process is provided for making the fuel absorbent by mixing polymer particles having fuel absorbing ability with a binder dissolved in a solvent, to thereby obtain a dispersion mixture having the polymer particles dispersed therein. The dispersion mixture is then dried to cause the polymer particles to be dispersed in a matrix of the binder. The fuel absorbent has excellent durability and fuel absorbing/desorbing ability.

24 Claims, 2 Drawing Sheets

FUEL ABSORBENT AND A PROCESS FOR MAKING THE FUEL ABSORBENT

BACKGROUND OF THE INVENTION

1. Field of the Invention

The present invention relates to a fuel absorbent having excellent durability and fuel absorbing/desorbing ability, and a process for making the fuel absorbent.

2. Description of Related Art

A large amount of fuel evaporates when it is supplied to an automobile fuel tank through a conventional fuel pump nozzle. Part of the fuel in the automobile tank and carburetor float chamber also evaporates, both while the automobile is running and when it is at rest.

In order to prevent evaporative leakage of fuel into the atmosphere, canisters, such as fuel evaporation loss control devices, filled with fuel absorbers are typically attached to, for example, automobile fuel tanks. Similar devices have also been employed to trap fuel evaporating or leaking from other types of fuel storage tanks. In such evaporation loss control devices, charcoal has been typically used as the fuel absorbent.

It has been proposed to use lipophilic polymer gels as fuel absorbents in Japanese Laid Open Patent Application Nos. 67222/1989 and 227861/1989. Such gels can be formed from polypropylene and styrene-butadiene copolymers. These conventional lipophilic gels absorb large amounts of liquid gasoline and its higher boiling point components, and then desorb them reversibly.

Conventional canisters employing such lipophilic gels are constructed so that liquid gasoline and gasoline components having 5 or more carbon atoms are absorbed by the lipophilic gels before they can contact charcoal because they degrade the working capacity of charcoal to absorb gasoline vapors, thus improving the working capacity, stability and regenerative properties of the canisters.

A conventional canister is shown in FIG. 1 (PRIOR ART). In order to obtain the fuel absorbent 25, fine polymer particles 22 can be applied to a thread-like or sheet-like base 9. The surface of the polymer particle 22 is covered with a dispersing agent which serves to bond each polymer particle 22 together to form the fuel absorbent 25. The polymer particle 22 is formed from an organic polymer compound comprising, for example, ethylene-propylene-diene copolymer, which has an excellent capacity to absorb the evaporated fuel. The polymer compound swells when absorbing the fuel, such as gasoline, because of a large affinity between the organic polymer compound and the evaporated fuel.

The fuel absorbent 25, however, is not firmly affixed to the base 9. After absorbing the fuel and becoming swollen, the fuel absorbent 25 is likely to fall off the base 9, which causes clogging in the canister, resulting in a reduced fuel absorbing/desorbing ability.

Another conventional canister is shown in FIG. 2 (PRIOR ART). A coating film 3, formed of urethane or silicone reaction product, can be coated on the surface of the fuel absorbent 25 which is affixed to the base 9. However, when the fuel absorbent 25 absorbs fuel above its absorption saturation ability, it falls off when it is subjected to vibration of the automobile.

Furthermore, friction occurs between bases 9, or between the base 9 and the container wall when the fuel absorbent 25 is subjected to the vibration of the automobile. Such friction will partially disintegrate the coating film 3 and the fuel absorbent 25 can fall off. As a result, the fuel absorbing/desorbing ability of the canister is deteriorated.

SUMMARY OF THE INVENTION

An object of the present invention is to provide a fuel absorbent with excellent durability and fuel absorbing/desorbing ability which solves the problems of conventional fuel absorbents.

Another object of the present invention is to provide a process for making the fuel absorbent.

An embodiment is a fuel absorbent comprising polymer particles having a fuel absorbing ability and a binder permeable to fuel. The fuel permeates the binder and is absorbed by the polymer particles. The polymer particles are uniformly dispersed in a matrix of the binder.

Another embodiment is a process for making the fuel absorbent comprising mixing polymer particles having fuel absorbing ability with a binder solution comprising a binder dissolved in a solvent, to thereby obtain a dispersion mixture. The dispersion mixture is then dried to form a binder matrix containing the polymer particles uniformly dispersed therein.

Other features and advantages of the present invention will be apparent from the following detailed description and the accompanying drawings.

DETAILED DESCRIPTION OF THE INVENTION

Figure 1:
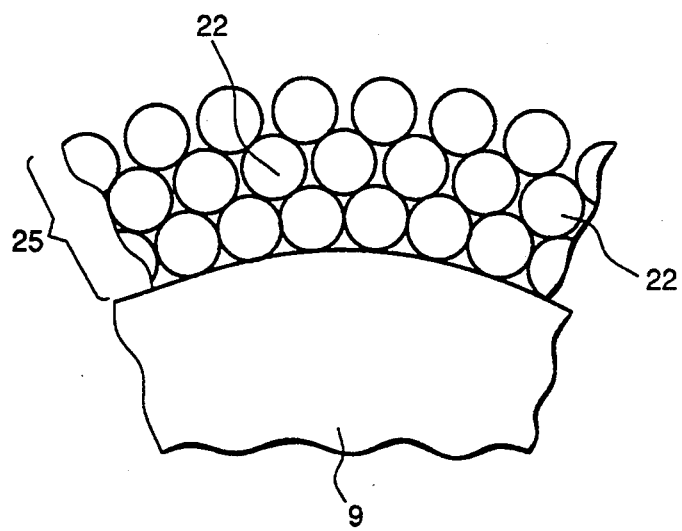
FIG. 1 (PRIOR ART) is a partial sectional view of a fuel absorbent applied to a base in a conventional canister.
Figure 2:
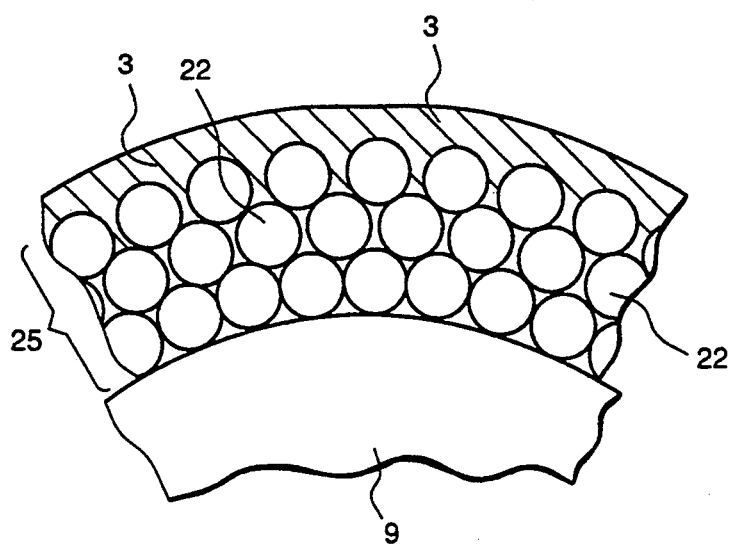
FIG. 2 (PRIOR ART) is a partial sectional view of a fuel absorbent applied to a base in a conventional canister.

The invention will be explained in detail.

In an embodiment, a fuel absorbent comprises fuel absorbing polymer particles dispersed in a binder matrix. The binder is permeable to fuel which allows gaseous or liquid fuel, such as gasoline, to pass from the outside of the fuel absorbent to the polymer particles dispersed in the binder (absorption cycle), or vice versa (desorption cycle).

The above polymer particles, having fuel absorbing ability, can comprise any polymer material used in conventional fuel absorbents. Examples of suitable polymers to make the polymer particles are uncrosslinked organic polymer compounds or organic polymer compounds which are sufficiently crosslinked to at least form a gel.

The fuel absorbing ability is the ability of the polymer compound to absorb fuel and swell. Preferably, the polymer compound has the ability to reversibly absorb the fuel, so that fuel can be absorbed and then later desorbed.

In another embodiment, a process for producing the fuel absorbent comprises mixing polymer particles having fuel absorbing ability with a binder solution comprising a binder dissolved in a solvent, to thereby obtain a dispersion mixture having the polymer particles dispersed therein. The dispersion mixture is then dried to form a binder matrix containing the polymer particles dispersed therein.

The binder can be crosslinked after forming the dispersion mixture, to thereby form a crosslinked binder matrix having the polymer particles dispersed therein.

The binder can be one or more polymer materials.

The binder can be two types, one with a crosslinking site, and another without a crosslinking site. The binder preferably has at least 1.0 or more crosslinking sites. There is no particular upper limit of the number of crosslinking sites that can be present.

The binder having crosslinking sites is preferably capable of forming a three-dimensional crosslinking structure among the polymer particles, for example, with the aid of a curing agent. The binder having crosslinking sites is preferably soluble in the fuel, such as gasoline, or in water, and after being crosslinked, the binder becomes insoluble in the fuel or in water. The binder made by crosslinking the polymer having crosslinking sites can also absorb and desorb the fuel because the polymer dissolving or swelling in the fuel is made insoluble by crosslinking.

Examples of the binders having crosslinking sites are as follows:
Styrene-acrylonitrile polymer;
Styrene-acrylonitrile-acrylic polymer;
Styrene-acrylonitrile-chlorinated polyethylene polymer;
Styrene-acrylonitrile-butadiene polymer;
Bismaleid polymer;
Olefin vinyl alcohol polymer;
Amino polymer;
Epoxy polymer;
Styrene-butadiene-methacrylate polymer;
1,2-polybutadiene polymer;
Unsaturated polyester polymer;
Acid modified polyethylene;
Natural rubber;
Cyclized natural rubber;
Isoprene rubber;
Butadiene rubber;
Styrene-butadiene polymer;
Acrylonitrile-butadiene rubber;
Carboxylic nitrile rubber;
Halogenated butyl rubber;
Ethylene-propylene rubber;
Acid modified ethylene-propylene rubber;
Ethylene-propylene-diene rubber;
Ethylene-vinyl acetate rubber;
Acrylic rubber;
Acryl-vinyl siloxane rubber;
Acryl-vinyl silyl rubber;
Acryl-ethylidene norbornene rubber;
Ethylene acrylic rubber;
Chlorosulfonated polyethylene;
Chlorinated polyethylene;
Epichlorohydrin rubber;
Epichlorohydrin-ethylene-oxide rubber;
Vinyl-methyl-silicone rubber; and Norbornene polymer.

The binder having no crosslinking site is preferably insoluble in the fuel. Examples of the binder having no crosslinking sites are as follows:
Cellulose polymer;
Fluoride rubber;
2-chlorobutadiene polymer;
Acrylic acid polymer;
Methacrylic acid polymer;
Acrylamide polymer;
Methacryl amide polymer;
Vinyl alcohol polymer;
Vinyl acetal polymer;
Vinyl chloride polymer;
Vinylidene chloride polymer;
Acrylonitrile polymer;
Methyacrylonitrile polymer;
Ethylene-terephthalate polymer;
Amide 6 polymer;
Amide 6, 6 polymer; and
Phosphazene polymer.

The binder having no crosslinking sites can absorb and desorb the fuel when a polymer material is used which is insoluable in the fuel but which can swell, for example, fluoro-rubber, 2-chlorobutadiene polymer, acyclic acid, methacrylic acid, acrylamide, methacrylic amide, and the like. The binder having no crosslinking sites can not absorb and desorb the fuel when a polymer material is used which is insoluable in the fuel but which can not swell, for example, cellulose, vinyl alcohol, vinyl acetate, vinyl chloride, vinylidene chloride, acrylonitrile, methacrylonitrile, ethylene-terphthalate, amide 6, amide 6,6, phosphazene, and the like.

Examples of solvents suitable for dissolving the binders are, for example: aromatic hydrocarbons, such as, toluene, benzene, and xylene; aliphatic hydrocarbons, such as, hexane and heptane; hydrocarbon halides, such as, methylene chloride and chloroform; alcohols, such as, methanol and ethanol; ketones, such as, acetone and methyl-ethyl ketone; DMF; THF; phenols; m-cresol; warm water; and the like.

The binder and the solvent are preferably mixed in a ratio of about 0.1 to about 70 wt. % binder, to about 30 to about 99.9 wt. % solvent.

The polymer particles can be one or more plastics of the following group (1), one or more rubbers/elastomers of the following group (2), or combinations of materials selected from the groups (1) and (2).

(1) Plastics:
Styrene-acrylonitrile-acrylic acid polymer;
Styrene-acrylonitrile-butadiene polymer;
Styrene-acrylonitrile-chlorinated polyethylene polymer;
Acrylic ester polymer;
Bismaleimid-triazine polymer;
Olefin vinyl alcohol polymer;
Amino resin;
Epoxy resin;
Coumarone resin;
Aryl resin;
Ethylene-alpha-olefin polymer;
Ethylene-vinyl acetate-vinyl-chloride polymer;
Ethylene-vinyl acetate polymer;
Ionomer resin;
Ketone resin;
Styrene-methacrylic acid polymer;
Styrene-butadiene-methacrylic acid polymer;
Nitrile resin;
Petroleum resin;
Polyarylate;
1,2-polybutadiene;
Polybutylene;
Polycarbonate;
Polyethylene;
Water crosslinking polyethylene;
Methyacryl resin;

Polymethylpentene;
Polypropylene;
Polyphenylene sulfon;
Polystyrene;
Polysulfon;
Styrene-acrylonitrile polymer;
Styrene-butadiene polymer;
Polyurethane;
Vinyl acetate polymer;
Polyvinyl acetal;
Silicone;
Unsaturated polyester resin;
Xylene resin;
Acid modified polypropylene;
Acid modified polyethylene; and a
Partial crosslinked body of the above plastics.
  (2) Rubbers/elastomers:
Natural rubber;
Cyclized natural rubber;
isoprene rubber;
Butadiene rubber;
Styrene-butadiene rubber;
Chloroprene rubber;
Acrylonitrile-butadiene rubber;
Carboxylic nitrile rubber;
Butyl rubber;
Halogenated butyl rubber;
Ethylene-propylene rubber;
Acid modified ethylene propylene rubber;
Ethylene-propylene-diene rubber;
Ethylene-vinyl acetate rubber;
Acrylic rubber;
Acrylic rubber;
Acryl-vinyl silyl rubber;
Acryl-vinyl siloxane rubber;
Acryl-ethylidene norbornene rubber;
Ethylene acrylic rubber;
Chlorosulfonated polyethylene;
Chlorinated polyethylene;
Epichlorohydrin rubber;
Epichlorohydrin-ethylene-oxide rubber;
Urethane rubber;
Methyl silicone rubber;
Vinyl-methyl-silicone rubber;
Phenyl-methyl-silicone rubber;
Norbornene polymer; and a
Partial crosslinked body of the above rubbers/elastomers.

Preferably, the polymer particles have the ability to reversibly absorb and desorb fuel, and sufficient heat resistance to withstand high temperatures in an engine compartment of an automobile. One or combinations of partial crosslinking of the following group of compounds can be combined to form such a preferred polymer particle:
Olefin vinyl alcohol polymer;
Ethylene-alpha-olefin polymer;
Ethylene-vinyl acetate polymer;
Polyethylene;
Water crosslinking polyethylene;
Vinyl acetate polymer;
Polyvinyl acetal;
Silicone;
Unsaturated polyester resin;
Acid modified polypropylene;
Acid modified polyethylene;
Ethylene-propylene rubber;
Acid modified-propylene rubber;
Ethylene-propylene-diene rubber;
Ethylene-vinyl acetate rubber;
Acrylic rubber;
Acryl-vinyl siloxane rubber;
Acryl-ethylidene norbornene rubber;
Ethylene acrylic rubber;
Chlorosulfonated polyethylene;
Chlorinated polyethylene;
Epichlorohydrin rubber;
Epichlorohydrin-ethylene-oxide rubber;
Methyl silicone rubber;
Vinyl-methyl-silicone rubber;
Phenyl-methyl-silicone rubber; and
Norbornene polymer.

The polymer particle can contain a solvent which has been used in the process for producing the polymer particle. In such a case, the solvent in the polymer particle is preferably the same as that contained in the binder solution.

The polymer particle to be added to the binder solution can be in the form of a dried powder. The particles can be any shape or size. The preferred particle size is about 0.5 mm or less.

The binder solution is preferably mixed with an additive such as, a curing agent, an anti-oxidant, a dispersion stabilizer, an extender, and the like. The curing agent is preferably compatible with a crosslinking site on the binder.

If the crosslinking site on the binder is a saturated polymer or vinyl group, the following curing agents can be used:

(1-1) Ammonium persulfate;
(1-2) Potassium persulfate;
(1-3) Sodium persulfate;
(1-4) Azo compounds, for example, azobis-isobutyronitrile (AIBN);
(1-5) Organic peroxide;
(1-5-1) Diacyl peroxide, for example, benzoyl peroxide, o-methylbenzoyl peroxide, 2,4-dichlorobenzoyl peroxide, Bis-3,3,5-trimethyl hexanoyl peroxide, lauroyl peroxide, p-chlorobenzoyl peroxide;
(1-5-2) Hydroperoxide, for example, 2,2,4-trimethyl pentyl-2-hydroperoxide, cumene hydroperoxide;
(1-5-3) Dialkyl peroxide, for example, dicymyl peroxide, 2-5-dimethyl-2,5,-di-(t-butyl peroxy)-hexane, 1,3-bis-(t-butyl peroxy-isoproply)-benzene, t-butylcumyl peroxide;
(1-5-4) Peroxy ketal, for example, 1,1-di-t-butyl-peroxy-3,3,5-trimethyl cyclohexane, 1, 1-di-t-butyl peroxy cyclohexane;
(1-5-5) Alkyl perester, for example, t-butyl peroxy-neodecanoate, t-butyl peroxy pivalate, t-butyl peroxy-2-ethyl hexanoate, t-butyl peroxy isobutyrate, di-t-butyl peroxy-hexahydro terephthalate, di-t-butyl peroxy azelate; and
(1-5-6) Percarbonate, for example, bis-(4-t-butyl cyclohexyl)peroxy dicarbonate, diisopropyl peroxydicarbonate, di-sec-butyl peroxydicarbonate; ketone peroxides, for example, methylethylketone peroxide, and cyclohexanone peroxide.

If the crosslinking site is a saturated polymer or polymers not containing a vinyl group, the following curing agent can be used:

(2-1) Carboxyl group, for example, an amine compound, an isocyanate compound, an epoxy compound, a metal alkoxy compound, a phenol resin, and an amino resin;

(2-2) Epoxy group or Tetra hydro group, for example, an isocyanate compound, an amine compound, a carboxylic acid compound, an acid anhydride, a sulfur compound, a polyol, and a phenol resin;

(2-3) Hydroxyl group, for example, an epoxy compound, a polyol, an amine compound, an isocyanate compound, an acid anhydride, an aldehyde compound, and an amino resin;

(2-4) Phosphoric group, for example, a polyol;

(2-5) Amino group, for example, a carboxylic acid compound, and an epoxy compound;

(2-6) Nitrile group, for example, an isocyanate compound, and phenol formaldehyde resin;

(2-7) Bismaleimid group, for example, a triazine compound;

(2-8) Amino group, for example, formaldehyde, and an isocyanate compound;

(2-9) Halogen group, for example, a thiol compound, phenol resin, and an amine compound;

(2-10) Chlorosulfonic group, for example, an amine compound, an epoxy compound, and a polyol; and (2-11) Epichlorohydrin group, for example, a thiol compound, phenol resin, and an amine compound.

The number 1 before the hyphen in the above formulae represents the group of the curing agent to be used in case the crosslinking sites in the binder-polymer is saturated or unsaturated (vinyl group). The number 2 before the hyphen in the above formulae represents the group of the curing agent to be used in case of other than saturated or unsaturated (vinyl group) crosslinking sites. The numbers after the hyphen in the above formulae represent reference numbers classified by the type of applicable curing agents. They do not refer to priority.

In another embodiment, for example, the dispersion mixture can be applied to a base and a curing agent added thereon, and dried. Then, for example, the mixture and the curing agent can be subjected to a crosslinking reaction between crosslinking sites in the binder-polymer and the curing agent, whereby the durability of the fuel absorbent is increased and the reinforcing effect of the binder is increased.

If an additive, such as the curing agent, is applied to the base after the dispersion mixture is applied, the crosslinking reaction between crosslinking sites in the binder-polymer and the curing agent is suspended during binder processing, resulting in further improving the efficiency of application to the base.

The curing agent can also be applied to the base with the binder dissolved in the solvent.

The polymer material having no crosslinking sites may be used as the binder. The dispersion mixture containing such a binder is preferably dried after it is applied to the base.

The crosslinking sites in the present invention refer to the crosslinking group and monomer component which are chemically reactable with a curing agent. The binder having no crosslinking sites herein means a binder having no chemically reactable crosslinking sites but may be self-crosslinked. Preferably, the binder having no crosslinking sites may be self-crosslinked with the aid of applying, for example, heat or ultraviolet light.

The base can be formed of, for example, fibers, cloth, unwoven fabrics, paper, wood, metals, plastics, films, and the like. The cloth, fibers and unwoven fabrics can be synthetic or natural materials.

A method for applying the fuel absorbent to the base can be, for example, a dip, spray, roll coating, curtain flow coating, brush coating, roller coating, electrostatic coating, and the like.

The dispersion mixture can be dried and granulated so that the fuel absorbent is in the form of a particle, which is not applied to the base.

The fuel absorbent that has been applied to the base, or granulated, is preferably coated with a coating film. The coating film can be, for example, the reactive substance of a urethane or silicone reaction. For example, polyol and a curing agent such as isocyanate are dissolved in toluene. The fuel absorbent is submerged into the obtained toluene solution and then dried to remove the toluene. The fuel absorbent is then heated by which the polyol is reacted with the isocyanate. The fuel absorbent is, thus, coated with the reactive substance of polyurethane. The reactive substance can be, for example, a thermosetting resin of urethane, epoxy, silicone and amino, having reactivity, for example, crosslinking or chain extension. The fuel absorbent coated with the coating film has increased durability.

In order to assure the porosity of the fuel absorbent as well as increasing its strength and rigidity, the coating film can be applied reticulately so as not to block the polymer particle porosity within the fuel absorbent. The coating film can be reticulately applied by spraying a solution of the reactive substance in a solvent, for example, about 1 to about 50% of the reactive substance, or by submerging the fuel absorbent in the solution of the reactive substance. For example, aromatic hydrocarbon, aliphatic hydrocarbon, alcohol, ketone, and water can be used as the solvent of the solution.

By increasing the strength and rigidity of the fuel absorbent, destruction of the polymer particle porosity by the weight of the fuel absorbent itself when it is placed, for example, in a case, is avoided. If the polymer particle porosity is not destroyed, the fuel is allowed to be smoothly diffused in the case. As a result, the fuel can be absorbed by the fuel absorbent more effectively, thus improving absorbance efficiency of the fuel absorbent.

The coating film preferably has sufficient flexibility to cope with excessive deformation. The coating film thickness is preferably in the range from about 0.1 to about 500 $\mu$m. If the film thickness is less than about 0.1 $\mu$m, the intensity is not sufficiently increased. If the thickness exceeds about 500 $\mu$m, the fuel trapping ability of the fuel absorbent can be considerably degraded.

In an embodiment, the polymer particles having fuel absorbing ability are uniformly dispersed in the binder matrix which is permeable to the fuel. That is, the binder covers each polymer particle to form a solid continuum.

The content of binder in the fuel absorbent can be described by the following equation:

(binder polymer solid amount (g))/ (binder polymer solid amount (g))+(fuel absorbing polymer particle amount (g))

The binder content is typically about 0.01 to 0.6 and preferably from 0.05 to 0.5 based on the total amount of binder polymer and fuel absorbing polymer.

The polymer particle according to the present invention, when it swells during absorption, will not fall off as in conventional canisters because it is contained in the binder matrix. Furthermore, the polymer particles can not disintegrate because they are held fast and can not vibrate against each other. The polymer particles will not fall off or be destroyed even when subjected to the vibration of the automobile. Therefore, the fuel absorbent according to the present invention has improved durability.

The crosslinked binder matrix is so formed to cope with the swelling of the gel during fuel absorption. The binder has the ability to allow the fuel to permeate and is insoluble in the fuel and water.

The fuel absorbent swells by trapping evaporated fuel, but is not dissolved by the fuel. After absorbing the evaporated fuel and becoming swollen, the fuel absorbent releases the trapped fuel in the process of purging in the evaporation loss control device, thus restoring its ability for absorbing the evaporated fuel. Thus, the fuel absorbent can be repeatedly purged of the trapped fuel, making it ideal for use in automotive fuel evaporation loss control devices, similar devices used in boilers, and the like.

The present invention will be further explained by the following non-limiting examples.

EXAMPLE 1

Figure 3:
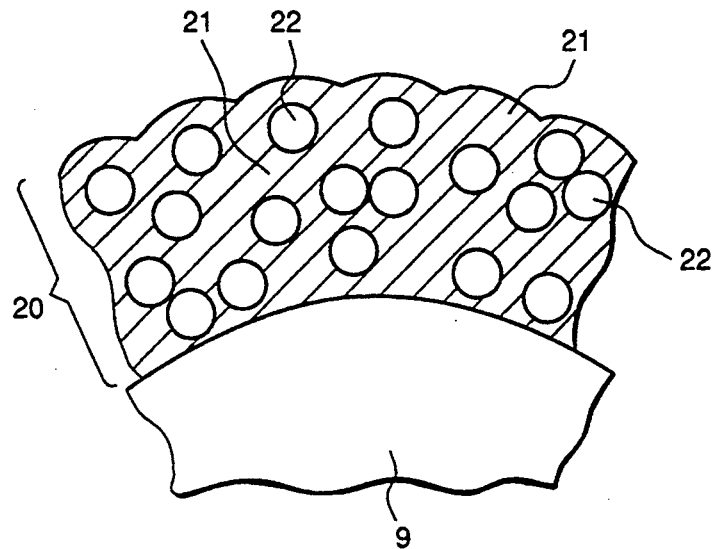
FIG. 3 is a partial sectional view of the fuel absorbent applied to a base in an embodiment of the present invention.

The fuel absorbent of the Example 1 according to the present invention will be described referring to FIG. 3.

A fuel absorbent 20 comprises polymer particles 22 having fuel absorbing ability, and a crosslinked binder 21 being permeable to the fuel to be absorbed. The polymer particles 22 are uniformly dispersed in a matrix of the crosslinked binder 21. The fuel absorbent 20 is applied to a base material 9 and carried thereon. The binder 1 is crosslinked in the fuel absorbent 20. The specific experimental procedure was the same as in Example 2.

In order to obtain the fuel absorbent 20, a binder solution comprising the binder dissolved in a solvent is mixed with the polymer particles to form a dispersion mixture. The dispersion mixture is applied to the base 9, and then dried.

In this example, maleic anhydride modified ethylene-propylene rubber (EP) was used as the binder 21, ethylene-propylene-ethylidene norbornene polymer (EPDM) as the polymer particle 22, and polyester fiber as the base material 9. Toluene was used as the solvent for dissolving the binder.

The fuel absorbent 20 of this example is formed into the solid continuum in which the binder 21 surrounds each polymer particle 22. The polymer particle 22 swollen during fuel absorption can not fall off as in conventional absorbents. The fuel absorbent 20 will not fall off or disintegrate when it is subjected to severe vibration in an automobile, thus increasing its intensity and durability.

Because the binder 21 is crosslinked, it can readily cope with the swelling of the gel during fuel absorption. The binder 21, thus, will not disintegrate. The binder also has excellent permeability to the fuel, thereby allowing fuel absorption by the polymer particles 22.

The fuel absorbent 20 and the base 9 of the present example have sufficient heat resistance, and are insoluble in the fuel and water. The binder 21 is chemically crosslinked with the polymer particles 22 dispersed therein. The thus obtained fuel absorbent 20 has a three-dimensional structure in a solid continuum.

EXAMPLE 2

A process for producing the fuel absorbent according to another embodiment will be described. A process for producing the polymer particles having fuel absorbing ability will also be explained.

40 g of ethylene-propylene-ethylidene norbornene polymer (Japan Synthetic Rubber Co., Ltd., EP33) (EPDM) was dissolved in 360 g of toluene (Nakaraitesk Co., Ltd., guaranteed reagent) to obtain a toluene solution of 10 wt. %. The solution was mixed with 16 g of benzoyl peroxide (Kayaku Akzo, Kadox B-CH50) as the crosslinking agent and 16 g of divinyl benzene (Nakaraitesk Co., Ltd.) as the crosslinking assistant to form a polymer solution. Nitrogen gas was bubbled into the polymer solution to remove residual oxygen therein.

In a pressure-resistant container to which a dispersion agitator (Yamato Kagaku Co., Ltd., Ultra disperser LK42) and a simple propeller agitator are attached, 12 g of polyvinyl alcohol (Nakaraitesk Co., Ltd., polymerization degree: 500, saponification degree: 86.5–89 mol %) was dissolved in 788 g of water to obtain a polyvinyl alcohol water solution of 1.5%. The polyvinyl alcohol solution was subjected to deoxidation to remove the residual oxygen by bubbling nitrogen gas thereinto.

The polyvinyl alcohol solution in the pressure-resistant container was subjected to high-speed stirring by means of the dispersion agitator while pouring the deoxidized polymer solution thereinto, resulting in a suspension.

The suspension was stirred at 250 rpm using the simple propeller agitator with the dispersion agitator detached. The pressure-resistant container was carefully placed into a hot water bath and the temperature of the suspension was increase up to 92° C. After the temperature reached 92° C., the suspension was stirred for about 6 hours to polymerize the suspension. The polymerization was terminated by adding a toluene solution comprising 4.9 g of toluene and 1 g of short-stop (Sumitomo Chemical Industries Co., Ltd., GA-80) dissolved therein to the polymerized suspension.

The polymerized suspension was put in a separatory funnel and cooled in ice. After about 3 hours or longer, the suspension was separated into an upper layer of creamy polymer particle gel, and a lower layer of water solution. The upper layer of polymer particle gel was obtained by removing the lower layer. The polymer particle gel had fine polymer particles with the diameter ranging from 10 to 100 $\mu$m. The polymer particle gel had a dry solids content of 11 wt. %. The polymer particle size typically ranges about $1 \times 10^{-5}$ mm to about 5 mm.

The process for producing the fuel absorbent using a binder and the polymer particles will be described.

1 g of maleic anhydride modified ethylene-propylene rubber (Japan Synthetic Rubber Co., Ltd., T7741P( (EP) as the binder was dissolved in 99 g of toluene as the solvent to obtain 100 g of binder solution (dry solids content: 0.5 wt. %). The polymer gel (100 g) was added to the binder solution while it was stirred at high speed by means of the dispersion agitator, resulting in a dispersion mixture.

Polyester fiber (Toray Industries, Inc., Span 20/3) was used as the base. The dispersion mixture was applied to the polyester fiber by dipping the polyester fiber therein. It was then air dried to form a fibrous absorbent.

1 g of amine curing agent (Nagase Kasei Co., Ltd., NH-10) was mixed with 99 g of toluene to make a curing agent solution. The toluene was the same kind of solvent as used for dissolving the binder. The fibrous absorbent was submerged in the curing agent solution, and dried. The absorbent was heated for 1 hour by means of a circulating hot air oven set at 150° C. thus crosslinking the binder to obtain the fuel absorbent according to the present invention. The fuel absorbent produced by the process of this example is the same as that of Example 1.

A binder used in the process of the present invention has at least 1.0 or more crosslinking sites, and is soluble in water and organic solvent such as gasoline. After crosslinking in the presence of the curing agent, a three dimensional crosslinking structure was formed among polymer molecules in the binder. The crosslinked binder was insoluble in water and the organic solvent.

The binder 21 and the polymer particles 22 are chemically bonded through crosslinking. The fuel absorbent 20 comprising the chemically bonded binder 21 and polymer particles 22 had a three dimensional structure in a solid continuum.

Since the binder 21 becomes insoluble in water and the organic solvent such as fuel after crosslinking, it will not dissolve in the fuel during use. Therefore, the fuel absorbent of the present invention has sufficient durability for long-service life. The fuel absorbent obtained according to this example provides the same effects as those of Example 1.

Examples 3–6, Comparative Examples C1–C4

As shown in Table 1, various types of fuel absorbents were produced based on the process of the Example 2, by using various kinds of polymer particles and binder, and changing the weight ratios of the dry solids content of the polymer particle gel and binder solution. The obtained fuel absorbents were applied to the same base as used in Examples 1 and 2 to produce fibrous absorbent materials.

The polymer particles and the binders used in examples 3 and 4 are the same as those in Examples 1 and 2.

In Examples 5 and 6, the polymer particle (AENB-/EVA) was prepared by mixing 20 g of acrylic ester-ethylidene norbornene (Japan Synthetic Rubber Co., Ltd., AR201) and 20 g of ethylene-vinyl acetate (Bayer Ltd., LEVAPRENE 450). Ethylene-acrylic rubber (Du Pont-Showa Denko Co., Ltd., VAMAC G) (EA) was used as the binder.

For the purpose of comparison, the base was dipped into the respective polymer particle gels. After drying the polymer particle gel, fibrous absorbents with the polymer particles coated thereon were produced. The two kinds of such absorbents are referred to as comparative examples C1 and C2. A coating film was further coated on the polymer particle surfaces of C1 and C2 to produce fibrous fuel absorbents, which are referred to as comparative examples C3 and C3, respectively.

In order to apply the above coating film, a coating solution was prepared by dissolving 1 g of maleic anhydride modified ethylene-propylene rubber (Japan Synthetic Rubber Co., Ltd., T7741P) in 99 g of toluene. The fibrous fuel absorbents C1 and C2 were submerged in the above coating solution. Then, the coating solution was dried. The fibrous absorbents were heated for 1 hour by means of a circulating hot air heating oven set at 150° C. The rubber contained in the coating solution was crosslinked, thus providing a fibrous absorbent covered with the coating film.

In order to evaluate the respective fuel absorbing capacity of the above obtained fuel absorbents, toluene absorbance and retention ratio of the absorbing gels were measured.

Toluene absorbance was measured as follows. The fuel absorbent (0.2 g) was put in a sample cell (weight:V) formed of 100 mesh stainless wire gauze, and weighed (sample weight:W), submerged in toluene for 70 hours and then taken out. Toluene adhering around the sample cell was wiped off and weighed (sample cell(V)+sample weight (W):Y). Toluene absorbance (wt. %) was derived from the following equation:

Toluene absorbance (wt. %)=$100 \times (Y-W)/(W-V)$.

The retention ratio of absorbing gel was measured as follows.

The fibrous absorbent (10 g) was accurately weighed (weight:P). The absorbent was submerged in toluene until it was saturated. It was then put in a conical flask with capacity of 300 cc to achieve a super saturation state by adding further toluene (100 cc). The flask was corked and shaken for 24 hours by using a shaking machine (Tokyo Rika Mfg. Co., Ltd., SS-81P) at a shaking width of 30 mm and shaking frequency of 60 times/minute. The fuel absorbent was taken out, dried and weighed (weight:Q). The retention ratio (wt. %) was derived from the following equation:

Retention ratio (wt. %)=$100 \times (Q/P)$.

The measurement results are shown in Tables 1 and 2.

In Tables 1 and 2, "EPDM" of the polymer particle refers to ethylene-propylene-thylidene norbornene polymer, and "AENB/EVA" refers to the mixture of acrylic ester-ethylidene norbornene and ethylene-vinyl acetate. In those Tables, "EP" of the binder refers to maleic anhydride modified ethylene-propylene rubber, and "EA" refers to ethylene-acrylic rubber. In column C of Table 1, "dry solids content of A" refers to the weight (g) of the dry solids content of 100 g of polymer particle gel. In column D of Table 1, "dry solids content of B" refers to the weight (g) of the dry solids content of the binder solution.

Tables 1 and 2 show that Examples 3–6, and Comparative Examples C1–C4 exhibit high toluene absorbances ranging from 400 to 600 wt. %. Examples 3–6 show the retention ratios ranging from 90 to 100 wt. %. While the comparative examples C1 and C2, in which the fibrous absorbents was applied with only polymer particles, show substantially low retention ratios ranging from 5 to 10 wt. %. The absorbents of C3 and C4 prepared by applying the coating film to the polymer particle surfaces of C1 and C2 show retention ratios ranging from 40 to 50 wt. % at most. The results clearly show that the retention ratios obtained in Examples 3–6 are significantly higher than those of Comparative Examples C1–C4.

TABLE 1

| Polymer Particle | EPDM EP | | | AENB/EVA EA | | |
|---|---|---|---|---|---|---|
| Binder | Ex. 3 | Ex. 4 | C1 | Ex. 5 | Ex. 6 | C2 |
| A Polymer Particle gel (g) | 100 | 100 | 100 | 100 | 100 | 100 |
| B Binder solution (g) | 100 | 100 | None | 100 | 200 | None |
| C Dry solids content of A (g) | 11 | 11 | 11 | 20 | 20 | 20 |
| D Dry solids content of B (g) | 0.5 | 1 | — | 10 | 20 | — |
| Toluene absorbance (%) | 550 | 520 | 500 | 420 | 340 | 630 |
| Retention ratio (%) | 95~100 | 95~100 | 5~10 | 90~100 | 95~100 | 5~10 |

TABLE 2

| Polymer Particle | EPDM EP | | | AENB/EVA EA | | |
|---|---|---|---|---|---|---|
| Binder | Ex. 3 | C3 | C1 | Ex. 5 | C4 | C2 |
| Binding means | Binder | Coating | None | Binder | Coating | None |
| Toluene absorbance (%) | 550 | 390 | 500 | 420 | 490 | 630 |
| Retention ratio (%) | 95~100 | 50~70 | 5~10 | 90~100 | 40~60 | 5~10 |

EXAMPLE 7

Figure 4:
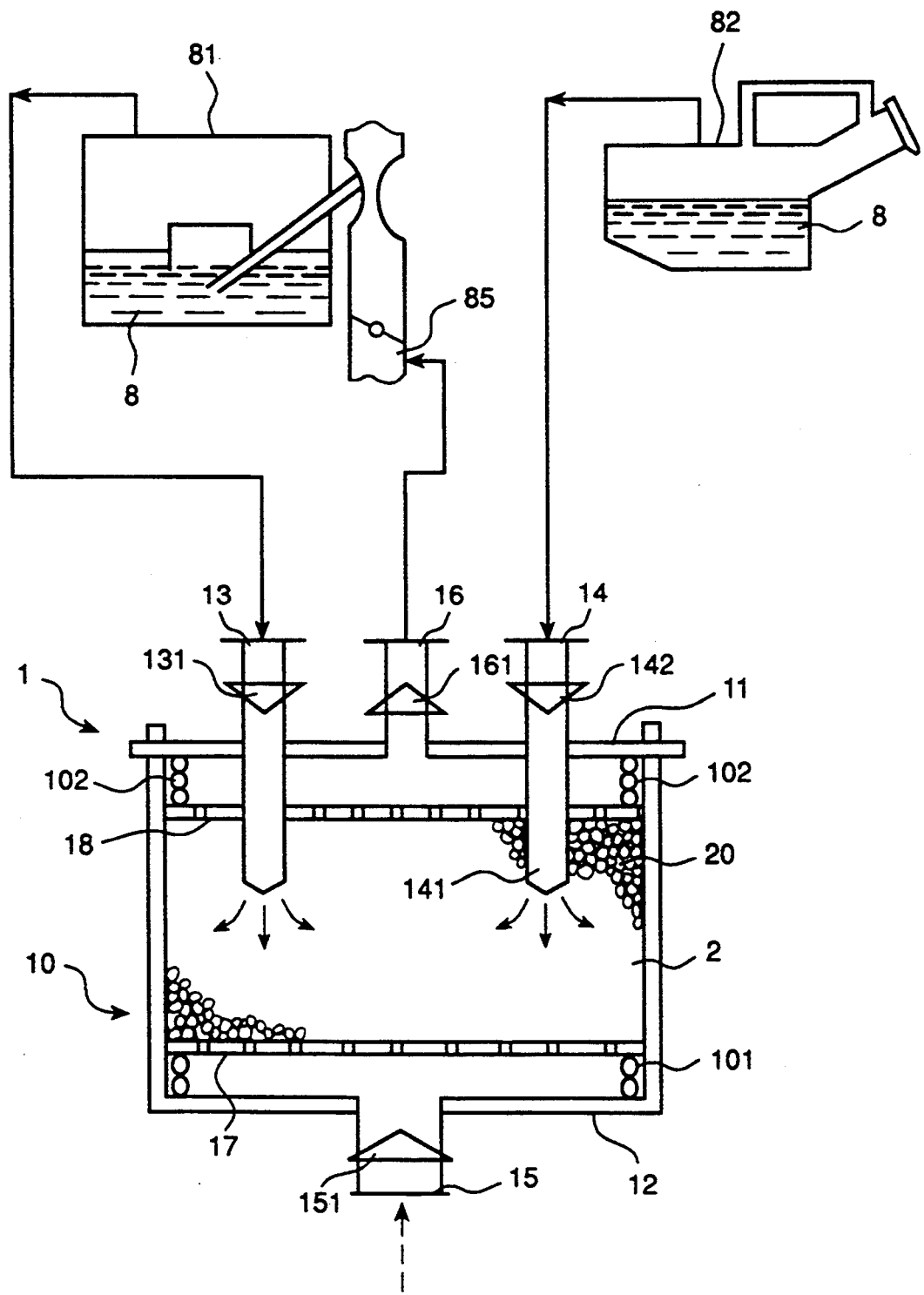
FIG. 4 is a schematic flow diagram of a fuel system using a canister according to the present invention.

This example describes an automobile fuel evaporation loss control canister in which fuel absorbents according to the present invention can be used referring to FIG. 4.

A fuel absorbent 20 is placed in an absorption chamber 2 formed in the interior of a housing body 10 of a canister 1.

The housing body 10 is cylindrical, and is provided with a lid 11 at its upper end and with a bottom plate 12 at its lower end. The lid 11 is provided with a purging pipe 16 and first and second introduction pipes 13 and 14 with their ends 141 projected into the interior of the absorption chamber 2.

The first introduction pipe 13 is connected to the upper space of a carburetor float chamber 81, and the second introduction pipe 14 is connected to a fuel tank 82 filled with gasoline 8 as fuel. The purging pipe 16 is connected to a purging port 85. The bottom plate 12 has an opening for a purging air pipe 15. The pipes 13, 14, 15 and 16 are fitted with valves 131, 142, 151 and 161, respectively.

A perforated plate 17 is positioned at the lower end of the absorption chamber 2, and another perforated plate 17 is pushed upwardly by a spring 101, and the perforated plate 18 is pushed downwardly by a spring 102.

Gasoline vapor evaporating in the carburetor float chamber 81 or in the fuel tank 82 are trapped by the canister 1 as described below. The vapor flows, via the first and second introduction pipes 13 and 14, into the absorption chamber 2, where it comes into contact with the fuel absorbent 20 and is absorbed.

During the period of absorption, the valves 131 and 142 fitted at the introduction pipes 13 and 14 are open, and the valve 161 of the purging pipe 16 and the valve 151 of the purging air pipe 15 are closed.

In the course of absorption, the fuel absorbent polymer 20 swells from trapped gasoline vapor.

After having absorbed a large quantity of gasoline vapor, the absorbent can be regenerated. If desired, the absorbent, after being used for a long period of time and repeatedly regenerated, can be replaced with fresh one by detaching the lid 11 from the housing body 10.

Regeneration of the absorbent can be performed by introducing air through the purging air pipe 15, with valves 131, 142, 151 and 161 reversed. The exhaust gas is discharged into the purging port 85 via the purging pipe 16. During the purging step, the air introduced into the canister 1 releases and discharges gasoline vapor absorbed by the fuel absorbent.

As described hereinabove, the fuel absorbent is capable of trapping evaporated fuel vapor, such as gasoline, in an efficient manner and can be used repeatedly by repetition of the absorption-desorption cycle.

While the invention has been described with reference to specific examples, it is to be understood that modifications or variations may be easily made by a person of ordinary skill in the art without departing from the scope or spirit of the present invention.

What is claimed is:

1. A fuel absorbent comprising:
   a crosslinked binder matrix permeable to a fuel and polymer particles having the ability to absorb said fuel dispersed therein.

2. A fuel absorbent according to claim 1, wherein said polymer particles comprises at least one of a plastic, rubber and elastomer.

3. A fuel absorbent according to claim 1, wherein said crosslinked binder is insoluble in fuel and in water.

4. A fuel absorbent according to claim 1, wherein said fuel absorbent further comprises a base to which said crosslinked binder matrix containing said polymer particles is applied.

5. A fuel absorbent according to claim 4, wherein said base comprises at least one of fiber, cloth, unwoven fabric, paper, wood, plate, metal, plastics and film.

6. A fuel absorbent according to claim 1, wherein a surface of said fuel absorbent is coated with a coating film comprising a thermosetting resin selected from the group consisting of urethane, epoxy, silicone, and amino resin.

7. A fuel absorbent according to claim 6, wherein said coating film has a film thickness in the range from about 0.1 to about 500 μm.

8. A fuel absorbent according to claim 1, wherein said polymer particles are ethylene-propylene-ethylidene norbornene polymer, and said crosslinked binder matrix is maleic anhydride modified ethylene-propylene rubber.

9. A fuel absorbent according to claim 1, wherein said polymer particles are a mixture of acrylic ester-ethylidene norbornene and ethylene-vinyl acetate, and said binder matrix is ethylene-acrylic rubber.

10. A process for producing a fuel absorbent comprising polymer particles having the ability to absorb a fuel dispersed in a cross-linked binder matrix permeable to said fuel comprising the steps of:
dissolving a binder in a solvent to prepare a binder solution;
dispersing said polymer particles in said binder solution to make a dispersion mixture;
crosslinking said binder; and
drying said dispersion mixture to form said fuel absorbent.

11. A process according to claim 10, wherein said dispersion mixture is applied to a base and a curing agent is applied thereon before drying.

12. A process according to claim 10, wherein said dispersion mixture and granulated after drying.

13. A process according to claim 10, wherein said binder is soluble in said fuel and in water before crosslinking and said binder is insoluble in said fuel and water after crosslinking.

14. A process as in claim 10, wherein said binder comprises a polymer having at least one or more crosslinking sites.

15. A process according to claim 10, wherein said solvent comprises at least one of an aromatic hydrocarbon, aliphatic hydrocarbon, alcohol, ketone, and water.

16. A process according to claim 10, wherein said binder solution contains said binder in a range from about 0.1 to about 70 wt. % and said solvent in a range from about 30 to about 99.9 wt. %.

17. A process according to claim 10, wherein said polymer particle comprises an uncrosslinked organic polymer compound or crosslinked organic polymer compound, said crosslinked organic polymer being at least in the form of a gel.

18. A process according to claim 10, wherein said polymer particle is a dried powder.

19. A process according to claim 10, wherein said polymer particle is ethylene-propylene-ethylidene norbornene polymer, and said binder is maleic anhydride modified ethylene-propylene rubber.

20. A process according to claim 10, wherein said polymer particle is a mixture of acrylic ester-ethylidene norbornene and ethylene-vinyl acetate, and said binder is ethylene-acrylic rubber.

21. A process according to claim 11, wherein said base comprises at least one of fiber, cloth, unwoven fabric, paper, wood, plate, metal, plastics, and film.

22. A process according to claim 11, wherein said application is carried out by using at least one method of dipping, spraying, roll coating, curtain coating, brush coating, roller coating, and electrostatic coating.

23. A process according to claim 11, wherein a surface of said fuel absorbent is coated with a coating film comprising at least one thermosetting resin selected from the group consisting of urethane, epoxy, silicone, and amino resin.

24. A process according to claim 23, wherein said coating film has a film thickness in a range from about 0.1 to about 500 μm.

* * * * *